Aug. 31, 1937.  L. T. SACHTLEBEN  2,091,526
FILM HANDLING APPARATUS
Filed Jan. 31, 1936
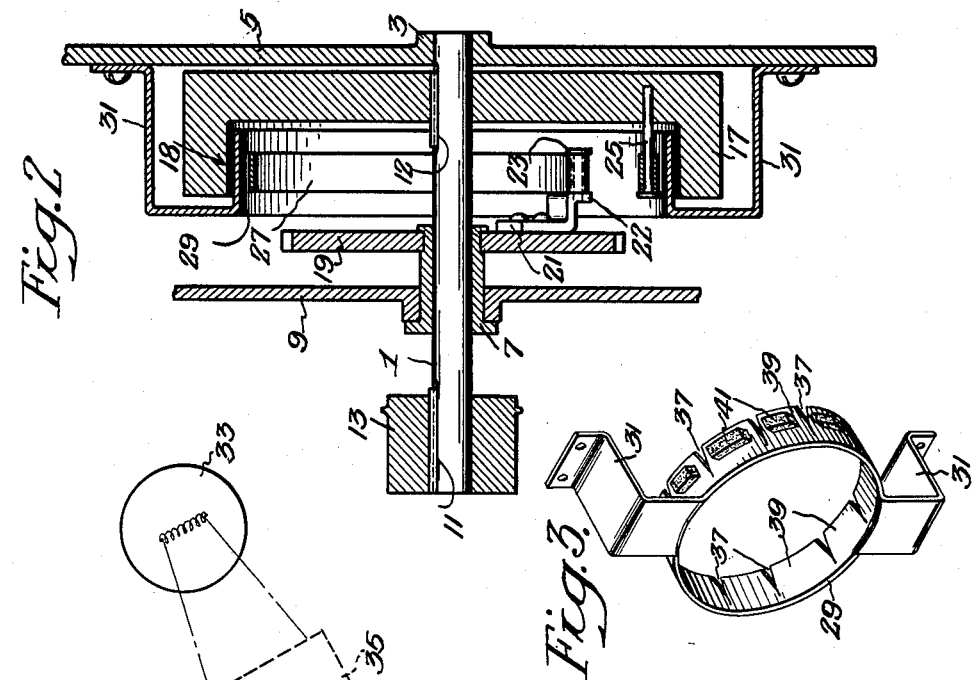
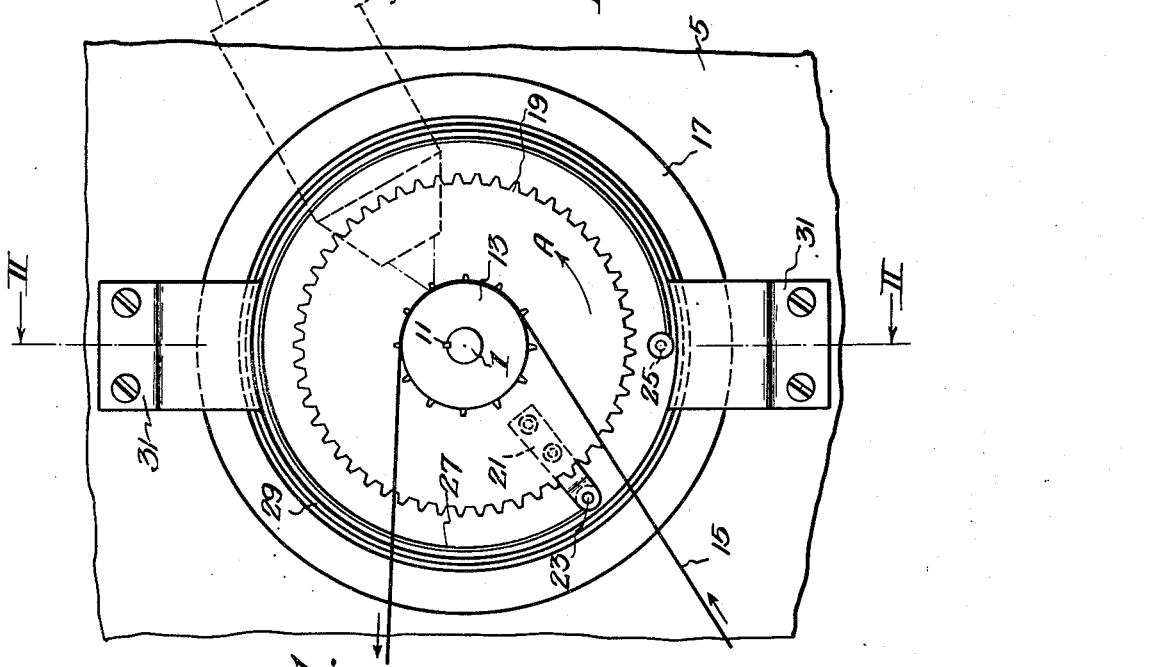
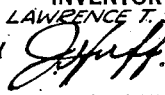
INVENTOR
LAWRENCE T. SACHTLEBEN
BY
ATTORNEY Patented Aug. 31, 1937

2,091,526

UNITED STATES PATENT OFFICE 2,091,526

FILM HANDLING APPARATUS

Lawrence T. Sachtleben, Camden, N. J., assignor to Radio Corporation of America, a corporation of Delaware Application January 31, 1936, Serial No. 61,836

10 Claims. (Cl. 271—2.3)

This invention relates to film handling apparatus, and more particularly to the means, in photophonographic apparatus, for advancing the photographic film strip.

It is well known that in order to obtain a satisfactory record of sound on a strip of film, the strip must be fed through the recorder with uniform speed past the recording point. Various means have been proposed to accomplish this result, and practically all of them include a mass, such as a flywheel, for steadying the motion of the moving strip.

In recorders or cameras which record both action and sound, the film strip may be stopped a great number of times, as upon the completion of taking each scene, for example. If synchronism is to be maintained throughout the film between the recorded action and the recorded sound, it is, obviously, necessary to stop the film simultaneously at the sound recording station as well as at the picture recording station. Well designed recorders are arranged to stop the film quite suddenly at the picture recording station and at a definite phase in the cycle of the intermittent movement, and if a similar stop is to be made simultaneously at the sound recording station, it is necessary to stop the film advancing device at that station suddenly also. However, since the moving flywheel has a large amount of kinetic energy stored therein, a sudden stopping thereof causes a severe shock to the driving mechanism. This has been one of the great disadvantages of prior art recorders.

The primary object of my invention is to provide improved film handling mechanism which is not subject to the foregoing disadvantage.

More specifically, it is an object of my invention to provide improved film handling mechanism which can be stopped quite suddenly without appreciable shock to the driving mechanism.

A further object of my invention is to provide improved film handling mechanism as aforesaid and including a rotation controlling mass with means whereby said mass may be quickly accelerated when power is applied to said mechanism, and with means for rapidly dissipating the kinetic energy stored in said mass while it is in motion, when the application of power is suddenly stopped.

Another object of my invention is to provide improved film handling mechanism of the type set forth which is simple in construction and highly efficient in use.

In accordance with my invention, I provide suitable braking means in conjunction with the flywheel which is adapted to rapidly dissipate the kinetic energy of the moving flywheel when it is stopped suddenly. This means may comprise a part of the driving mechanism itself, if desired, or it may be separate from but under the control of the driving mechanism, becoming effective to dissipate the aforesaid energy as soon as the driving mechanism has stopped. In this manner, the flywheel is quickly stopped without causing appreciable shock to the driving parts or to any other parts of the camera.

The novel features that I consider characteristic of my invention are set forth with particularity in the appended claims. The invention itself, however, together with its method of operation, as well as additional objects and advantages thereof, will best be understood from the following description of a specific embodiment thereof, when read in connection with the accompanying drawing in which Figure 1 is a side elevation of the mechanism comprising the sound recording station of a camera, said mechanism having my present invention incorporated therein, and certain of the camera parts being omitted for the sake of clearness, Fig. 2 is a sectional view taken on the line II—II of Fig. 1, and Fig. 3 is a perspective view of a modified form of braking device suitable for use in connection with my invention.

Referring more specifically to the drawing wherein similar reference characters designate corresponding parts throughout, there is shown a shaft 1 rotatably carried within a bearing 3 of a support 5 and a bushing 7 which is carried by a support 9. Fixed to one end of the shaft 1, as by a key 11, is a sprocket 13 on which a film strip 15 may be threaded, while a flywheel 17, preferably of hollow construction, is fixed to the other end of the shaft 1 by a key or equivalent device 12. The shaft 1, the sprocket 13 and the flywheel 17 thus rotate as a unit, the sprocket 13 advancing the film strip 15 under the control of the flywheel 17.

Mounted on the bushing 7 for rotation thereon relative to the shaft 1 is a driving element, such as a gear 19, which receives its power from a suitable motor (not shown). The gear 19 has secured thereto a radially extending arm 21 which carries a pin 23 upon the offset end 22 thereof, while a similar pin 25 is carried by the flywheel 17, the pins 23 and 25 being substantially equidistant radially from the axis of the shaft 1 and being circumferentially spaced somewhat, as clearly shown in Fig. 1. Power is transmitted to the flywheel 17 from the gear 19 by means of a circumferentially arranged, resilient member 27, such as a spring steel band or wire, which has one end thereof secured around the pin 23 and its other end secured around the pin 25, the spring band 27 being adapted to either expand or contract radially of the flywheel 17 upon relative movement between the gear 19 and the flywheel, depending upon whether the former is rotating slower or faster than the latter. An annular brake drum 29, secured to the support 5 through its diametrically opposite arms 31, extends into the hollow flywheel 17 about the spring band 27 and serves a purpose presently to be set forth.

The apparatus thus far described may comprise part of either a recording system or a reproducing system, although I have chosen to illustrate it as a recording device wherein the uniformly rotating sprocket 13 constitutes the recording station at which light from a suitable source 33 is focused on the film 15 by means of an optical system shown conventionally at 35. When the recorder or camera is first started, the gear 19 rotates relative to the flywheel 17 in the direction of the arrow A (Fig. 1) until the pin 23 engages the pin 25, whereupon the gear 19 and the flywheel 17 become directly coupled during the primary or initial acceleration of the mechanism and the spring 27 is relieved of the accelerating torque. Presently, the flywheel is brought up to the speed of the driving gear 19 and when this steady state is reached, the spring band 27 again takes up its normal position and carries the light, steady load of the flywheel and the film. Since no great amount of energy is stored in the spring 27 when the mechanism is started and during initial acceleration of the flywheel, the oscillations which may occur when the steady state is reached are of small amplitude and are quickly damped out.

When the gear 19 is quickly or suddenly stopped, the flywheel 17 continues to rotate, the pins 23 and 25 move farther apart, and the spring band 27 expands against the inner surface of the brake band 29. Preferably, the brake band 29 is so arranged with respect to the spring 27 and the latter is so constructed that its end adjacent the pin 23 first engages the brake band 29 and then, upon expanding, it contacts progressively along its length to a point closely adjacent the pin 25 as the relative displacement of the flywheel 17 and the gear 19 increases. This progression is, of course, in a direction opposite to the direction or rotation of the flywheel 17, whereby a maximum amount of slip takes place between the spring 27 and the brake band 29 before locking of the brake band 29 and the flywheel 17 takes place. The result is that a maximum amount of energy of motion of the flywheel is frictionally dissipated and the flywheel is quickly brought to a smooth stop.

The foregoing construction is ideal because all the energy of motion of the flywheel is dissipated in heat and no shock can be transmitted to the mechanism, since the expansion of the spring 27 cannot result in a rigid coupling between the flywheel and the gear 19. The stationary brake band 29 supplies all the tangential force which is effective in stopping the flywheel. If desired, however, the brake band 29 may be omitted and the spring band 27 caused to engage the inner annular surface 18 of the flywheel itself, or the brake band 29 may be provided with a peripheral brake pad on its surface next adjacent the surface 18 of the flywheel and forced into engagement with the surface 18 upon expansion of the spring 27. Such a construction is shown in Fig. 3 wherein the brake drum 29, made of a resilient material, is slitted at a plurality of circumferentially spaced points to provide a plurality of tabs 39 on each of which is fixed a brake pad 41. When the spring band 27 expands, it forces the tabs apart somewhat at the slits 37 until the brake pads 41 contact the surface 18 of the flywheel. In any case, the energy of motion of the flywheel 17 is quickly dissipated frictionally as relative motion occurs between it and the expanded spring 27 or the expanded brake drum 29, as the case may be.

Although I have shown and described my invention in some detail, I am fully aware that it may be embodied in various forms and with numerous changes, and I therefore desire that it shall not be limited except insofar as is necessitated by the prior art and by the spirit of the appended claims.

I claim:

1. Film handling apparatus comprising, in combination, means for advancing a film strip, a flywheel cooperatively associated therewith, means for driving said flywheel and said first named means, and means associated with said flywheel and controlled by said driving means for relatively rapidly dissipating the kinetic energy stored in the flywheel when in motion upon sudden stopping of said driving means.

2. Film handling apparatus comprising, in combination, a rotatable member for advancing a film strip, a flywheel cooperatively related to and rotatable with said member, a driving element, resilient means coupling said driving element and said flywheel, said resilient means being constructed and arranged to receive from the flywheel the kinetic energy stored therein when in motion upon sudden stopping of said driving element, and means associated with said resilient coupling means for rapidly dissipating said energy.

3. Film handling apparatus comprising, in combination, a rotatable member for advancing a film strip, a flywheel cooperatively related to and rotatable with said member, a driving element, a substantially circumferentially arranged, radially expansible and contractible spring member coupling said driving element and said flywheel, said spring member being adapted to receive from said flywheel the kinetic energy stored therein when in motion upon sudden stopping of said driving element and to expand radially, and means arranged to be contacted by the expanding spring member to frictionally dissipate the energy acquired by said spring member from said flywheel.

4. Film handling apparatus comprising, in combination, a rotatable member for advancing a film strip, a flywheel cooperatively related to and rotatable with said member, a driving element, a substantially circumferentially arranged, radially expansible and contractible spring member coupling said driving element and said flywheel, and a brake drum associated with said spring member, said spring member being adapted to receive from said flywheel the kinetic energy stored therein when in motion upon sudden stopping of said driving element and to expand radially into frictional contact with said brake drum, whereby to rapidly dissipate the energy acquired by said spring member from said flywheel.

5. The invention set forth in claim 4 characterized in that one end of said spring member is fixed to said driving element and the other end thereof is fixed to said flywheel, and characterized further in that said spring member is so arranged with respect to said brake drum that, upon sudden stopping of said driving element, continued rotation of said flywheel will cause said spring member to engage said brake drum first adjacent its first named end and then progressively along its length to adjacent its flywheel coupled end.

6. The invention set forth in claim 4 characterized in that said driving element and said flywheel are concentrically arranged, said driving element having a radially extending arm thereon, and characterized further in that said spring member has one end thereof fixed to said arm and the other end thereof fixed to said flywheel at substantially the same radial distance from the common axis of said driving element and said drum but in slightly circumferentially spaced relation whereby, upon rotation of said driving element, the first named end of said spring member catches up to and engages its other end to initially directly drive said flywheel.

7. Film handling apparatus comprising, in combination, a shaft, a rotatable film advancing member fixed to said shaft, a flywheel also fixed to said shaft in spaced relation to and rotatable with said film advancing member, a rotatable driving element loosely mounted on said shaft, a spring member arranged circumferentially about said shaft and having one end thereof fixed to said driving element and its other end fixed to said flywheel in circumferentially spaced relation to its first end whereby said spring member is adapted to expand or contract radially upon relative motion between said driving element and said flywheel, and a brake band associated with said spring member, said spring member being adapted to receive from said flywheel the kinetic energy stored therein when in motion upon sudden stopping of said driving element and to expand radially into frictional engagement with said brake band whereby to rapidly dissipate the kinetic energy of rotation of said flywheel upon continued rotation thereof subsequent to stopping of said driving element.

8. Film handling apparatus comprising, in combination, a rotatable member for advancing a film strip, a flywheel cooperatively related to and rotatable with said member, a driving element, a substantially circumferentially arranged, radially expansible and contractible spring member coupling said driving element and said flywheel, and braking means arranged to be contacted by the spring member when expanded upon sudden stopping of said driving element to cause frictional dissipation of the energy stored in said flywheel by reason of its motion.

9. Film handling apparatus comprising, in combination, a rotatable member for advancing a film strip, a hollow flywheel cooperatively related to and rotatable with said member, a driving element, a radially expansible and contractible spring member arranged substantially circumferentially within said flywheel and coupling said flywheel with said driving element, and resilient braking means interposed between said spring member and said flywheel, said spring member being adapted to receive energy from said flywheel upon sudden stopping of said driving element and to expand into engagement with said braking means to force said braking means into contact with said flywheel whereby to rapidly dissipate the energy stored in said flywheel by reason of its motion.

10. The method of operating film handling apparatus wherein a film strip is advanced under the control of a driven flywheel which comprises suddenly stopping the element which drives said flywheel and substantially simultaneously rapidly dissipating the kinetic energy stored in said flywheel by reason of its motion, whereby shock to said driving element is prevented, said dissipation being automatically effected by the stopping of said element.

LAWRENCE T. SACHTLEBEN.